Nov. 18, 1969 S. C. REQUA 3,479,646

DIGITALLY ADDRESSED SOLID STATE ELECTROLUMINESCENT DISPLAY DEVICE

Filed June 10, 1968 2 Sheets-Sheet 1

INVENTOR.
STANLEY C. REQUA
BY
Sokolski & Wohlgemuth
ATTORNEYS

INVENTOR.
STANLEY C. REQUA
BY
Sokolski & Wohlgemuth
ATTORNEYS

United States Patent Office 3,479,646

Patented Nov. 18, 1969

3,479,646

DIGITALLY ADDRESSED SOLID STATE ELECTROLUMINESCENT DISPLAY DEVICE

Stanley C. Requa, Northridge, Calif., assignor to Northrop Corporation, Beverly Hills, Calif., a corporation of California Filed June 10, 1968, Ser. No. 735,835

Int. Cl. G08b 5/22

U.S. Cl. 340—166 8 Claims

ABSTRACT OF THE DISCLOSURE

An electroluminescent matrix display panel is formed on a transparent substrate, such as glass, by means of a first plurality of parallel conductive strips and a second plurality of parallel conductive strips oriented normal to the first group of strips, a layer of electroluminescent material being sandwiched between the two groups of strips. The matrix thus formed by the strips and the electroluminescent phosphor is excited to produce luminescence of a single matrix element at a time by means of an electro-optical commutator which is capable of electrically energizing any matrix element in a random fashion in response to digital control signals. This commutator is formed with separate commutator units for each of the groups of conductive strips, each such commutator unit comprising a photoconductive member interposed between the power source and the associated strips, and an electroluminescent member for exciting each photoconductive member in response to the digital control signals.

This invention relates to electroluminescent display devices and more particularly to such a device which operates in response to a random digital addressing signal.

Electroluminescent display devices utilizing flying spot scanning and operating in response to digital intergrated scanning circuitry which is capable of random addressing, are particularly useful for such display applications such as computer readouts, plotting and tracking board displays, and the like. Devices of this type have the advantage of lightweight flat construction. Further, this type of solid state device does not require an evacuated envelope as do cathode ray displays. This type of device, however, requires a large number of input electrodes and switching positions if high resolution is to be achieved in view of the fact that it is implemented by means of a plurality of cross grids which establish the display elements, each of the grids requiring a switching signal to effect its operation. Thus, for example, in this type of flying spot scanner of the prior art, for a 64-element display, 8 horizontal and 8 vertical switching elements are required; or for example, for a resolution of 65,536 elements 256 horizontal and 256 vertical switches are needed.

The device of this invention, by virtue of its unique commutator device, is capable of achieving a resolution of "$N^2$" elements with only $\log_2 (N^2)$ switches. Thus, for the device of this invention, only 6 switches are required rather than 16 for a 64-element array, and where the advantage becomes more apparent, only 16 switches rather than 512 are required for a 65,536 element array.

The invention will now be described in connection with the accompanying drawings, of which:

Briefly described, the device of the invention comprises an electroluminescent display panel formed on a transparent substrate by means of first and second groups of grids which run normal to each other between which grids is sandwiched an electroluminescent layer. The grids and electroluminescent layer form a display matrix defining display elements at the cross points between the grids. The grids are excited by means of an electroluminescent commutator which comprises separate units for selectively energizing various combinations of cross grids. The commutator units each include a photo conductive member interposed between the grids and a power source. An electroluminescent member divided into a plurality of sections in a binary coded arrangement is excited to emit light in a selective pattern in response to digital addressing signals. The portions of the electroluminescent member which are excited in response to the digital control signals in turn excite the photoconductive portions located opposite thereto, and this provides a low resistance current path through such excited photoconductive portions. The non-excited photoconductive portions have a high electrical resistance, permitting little current flow therethrough. By virtue of the binary coding of the electroluminescent members, low resistance current paths can be provided through the photoconductive member to a selected pair of the conductive strips of the matrix at a time, this in response to a particular combination of binary control signals.

Figures 1, 2, 3:
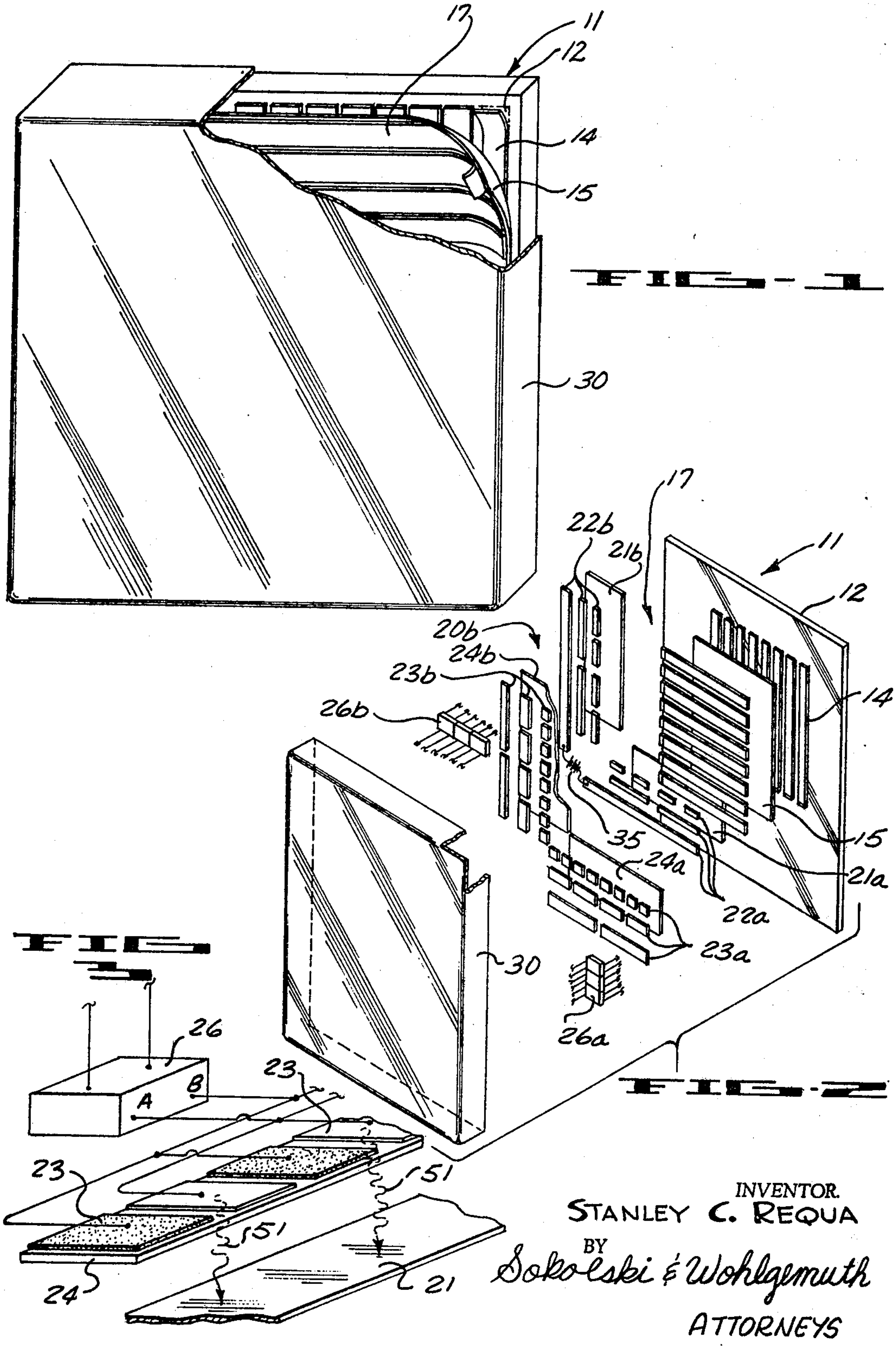
FIG. 1 is a perspective view of one embodiment of the device of the invention.
FIG. 2 is an exploded view of the embodiment of FIG. 1.
FIG. 3 is a perspective view illustrating the operation of the commutator utilized in the embodiment of FIG. 1.

Referring now to FIGS. 1 and 2, one embodiment of the device of the invention is illustrated. Display panel 11 comprises a transparent plate 12 which may be of glass, on which is deposited a plurality of conductive grid or strip members 14. Grid members 14 may be of tin oxide which is applied to the glass by a well known technique, such as reactive sputtering. Grid members 14 must be transparent to permit the optical display to pass therethrough.

Deposited over grid members 14 is a layer 15 of electroluminescent material, such as zinc sulfide, which is activated by appropriate treatment with chemical agents such as copper, chlorine and manganese, to render it responsive to either direct or alternating voltage. Electroluminescent layer 15 may be deposited by vacuum deposition techniques which are well known in the art. To complete display member 11, a plurality of conductive grids or strips 17, which run normal to strips 14, are deposited on electroluminescent layer 15 by vacuum deposition techniques well known in the art. Grids 17 are preferably of a highly reflective material such as aluminum.

Cummutator member 20 comprises layers **21*a* and 21*b* of photoconductive material such as cadimum sulfide or cadmium selenide with appropriate activators such as cadmium chloride and copper or silver. Layers 21*a* and 21*b* are deposited on glass substrate 12, such films subsequently being thermally treated at a temperature of the order of 500° C. Electrically conductive strips 22*a* and 22*b* may be of metallic indium or silver and are applied by vacuum deposition over photoconductive layers 21*a* and 21*b*** respectively.

Electroluminescent strips **23*a* and 23*b*, which may be of a similar material to electroluminescent layer 15 are deposited on transparent substrates 24*a* and 24*b* respectively by vacuum deposition techniques or as a powder in a high dielectric constant matrix as well known in the art. Substrates 24*a* and 24*b* may be of a suitable transparent thin plastic such as Mylar fabricated by Du Pont for the latter, or fiber optic plates in the former case. Substrate members 24*a* and 24*b* are placed over conductive strips 22***a* and 22*b* respectively with the electroluminescent strips 23*a* and 23*b* running between the conductive strips 22*a* and 22*b*. Substrates 24*a* and 24*b* may be suitably aligned with and attached to plate 12 by means of a suitable adherent.

Flipflop switches 26*a* and 26*b* are connected to electroluminescent elements 23*a* and 23*b* and excite such elements in a predesired manner, as to be described in connection with FIG. 5. The display panel 11 and the commutator member 20 are contained in housing 30 as shown in FIG. 1. This housing as already noted, need not be vacuum tight. A power source 35 is connected between the outermost of strips 22*a* and 22*b* to provide power for exciting the display as to be described in connection with FIGS. 4 and 5.

Figures 4, 5:
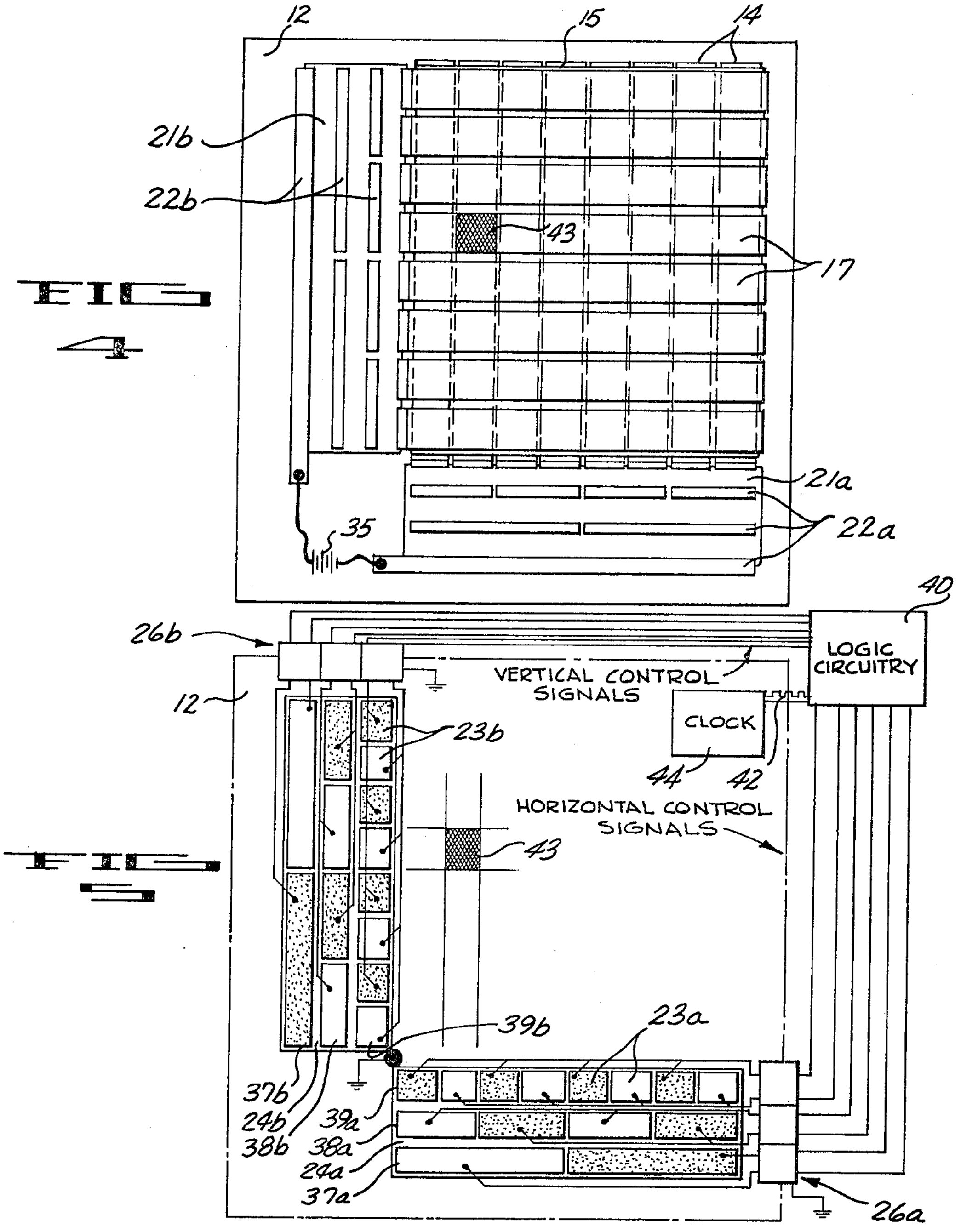
FIG. 4 is a scehmatic view illustrating the photoconductive portions of the commutator and the electroluminescent matrix of the embodiment of FIG. 1.
FIG. 5 is a schematic view illustrating the binary coded electroluminescent commutator portions and the control circuitry of the embodiment of FIG. 1.

Referring now to FIGS. 4 and 5, the display matrix and control circuitry of the embodiment of FIGS. 1 and 2 are illustrated schematically. For the purposes of illustration, the display matrix is shown in FIG. 4, while the control circuitry is shown in FIG. 5. It will be apparent, however, that elements shown in FIG. 5 are superimposed over associated elements shown in FIG. 4 in the manner indicated in FIG. 2. As shown in FIG. 4, vertical transparent conductive strips 14 are deposited on glass substrate 12, an electroluminescent layer 15 then being deposited over the vertical strips, and finally horizontal reflective strips 17 deposited over electroluminescent layer 15. The details of this structure have been described in detail in connection with FIG. 2 and therefore will not be repeated here. Deposited on plate 12 adjacent to the edges of vertical strips 14 and in contact with such edges is layer 21*a* of photoconductive material. A similar photoconductive layer 21*b* is deposited on plate 12 adjacent to the edges of horizontal strips 17. Electrically conductive strips 22*a* and 22*b* are deposited over photoconductive layers 21*a* and 21*b* respectively. DC power source 35 is connected between the outermost of conductive strips 22*a* and 22*b* which extend along substantially the entire length of the associated photoconductive layers. Power source 35 may be AC if so desired. It should be noted along these lines that the use of an AC voltage generally results in increased brightness of the display over DC voltage and the suitability of this device for use with AC is one inherent advantage thereof over prior art devices which are generally limited to DC power sources.

Referring now to FIG. 5, electroluminescent strips 23*a* 23*b* are deposited on transparent substrates 24*a* and 24*b* respectively. Electroluminescent strips 23*a* and 23*b* are individual elements electrically separated from each other and set up in a binary coded arrangement, as shown for example in the figure. Thus, electroluminescent strip elements 23*a* and 23*b* are arranged in separate rows 37*a* 38*a*, 39*a* and 37*b* , 38*b*, and 39*b*, half the elements in each row being connected to one of the stages of one of flip-flops 26*a* or 26*b*, the other half of these elements being connected to the other stage of the associated flipflop. For the convenience of illustrating the operation of the device of the invention, half of electroluminescent elements 23*a* and 23*b* are stippled to indicate that they are not being energized by the associated flipflops, while the other half of these elements are shown without stippling to indicate that they are being energized.

Flipflops 26*a* and 26*b* may be controlled by appropriate logic circuitry 40 operating in response to clock pulses 42 from clock 44 in accordance with techniques well known in the art. Thus, in accordance with the logical control, the flipflops are each driven to one state or the other in response to appropriate control signals to bring half of electroluminescent elements 23*a* and 23*b* to an energized state, while the other half of the electroluminescent elements are deenergized. When the electroluminescent elements 23*a* and 23*b* are energized, they emit light which passes through transparent substrates 24*a* and 24*a* respectively and impinges upon the immediately adjacent portions of associated photoconductive layers

21*a* and 21*b*. When photoconductive layers 21*a* and 21*b* are excited by light, they exhibit low resistance characteristics and thus readily pass current therethrough. In the absence of such light energization, the photoconductive layers exhibit high electrical resistance characteristics. Electrically conductive strips 22*a* and 22*b* act to bridge the gaps between the portions of photoconductors 21*a* and 21*b* which are capable of being excited by oppositely positioned electroluminescent elements 23*a* and 23*b*, there being the necessity for a gap between the electroluminescent elements to enable separate control thereof in response to the flipflops.

For the particular excitation of electroluminescent elements 23*a* and 23*b* shown in the illustrative example of FIG. 5, i.e. with the unstippled portions energized, a single matrix element 43 is excited in view of the fact that with the indicated excitation pattern the current from power source 35 can only find a complete electrical path through the photoconductive layers 21*a* and 21*b* and the vertical and horizontal conductive strips 14 and 17 to this one portion of the matrix. It should be apparent that with various other combinations of excitation of the electroluminescent elements 23*a* and 23*b* by the associated flipflops 26*a* and 26*b*, that the other matrix elements can be separately energized, there being a combination of excitations of electroluminescent elements for each and every element in the display matrix. Thus it can be seen that with a relatively small number of control flipflops a matrix having a large number of display elements can be energized in a random fashion in response to logical control circuitry.

Referring now to FIG. 3, the operation of the binary coded electroluminescent sections in response to the flipflops is schematically illustrated. At any one time, flipflop 26 will have an energizing potential for the electroluminescent elements either at the output indicated as A or at the output indicated as B. For the purposes of the example it is assumed that the A output is capable of energizing electroluminescent elements 23 connected thereto. Thus, as shown, the electroluminescent elements 23 shown unstippled are energized while those shown with stippling are deenergized. The energized elements have light outputs indicated by arrows 51 and 52. Light as indicated by arrows 51 and 52 passes through transparent substrate 24 and impinges against photoconductive layer 21 causing the portion of layer 21 so light energized to have a low electrical resistance. On the other hand, the portions of photoconductive layer 21 not so energized, i.e., those portions opposite the stippled electroluminescent sections 23, have a high electrical resistance. In this manner, the current paths from the power source 35 to the display matrix are selectively provided to energize single matrix elements at a time in response to the control flipflops.

I claim:

1. In a solid state display device, said device including an electroluminescent matrix display panel comprising a display plate member, a first plurality of conductive grids, a layer of electroluminescent material and a second plurality of conductive grid members running across said first plurality of grids, said grids and said electroluminescent layer all being formed on said plate member to constitute the matrix, the improvement comprising means for energizing selected portions of said matrix in response to digital control signals comprising first and second electroluminescent commutator units attached to said first and second plurality of grids respectively, said electroluminescent commutator units each including a separate photoconductive member in electrical contact with each of said first and second plurality of grids respectively, a power source, means for connecting said power source between said photoconductive members, an electroluminescent member for each of said photoconductive members, said electroluminescent members being formed from a plurality of electroluminescent elements in a binary coded arrangement, said elements being arranged in separate rows and placed immediately opposite said photoconductive members, binary switch means for energizing half of the electroluminescent elements in each row at a time, and logical control circuit means for selectively driving said switch means to energize a selected portion of the matrix at a time.

2. The device of claim 1 wherein the electroluminescent layer of said display panel is sandwiched between the conductive grids.

3. The device of claim 1 wherein each of said switch means comprises a flipflop circuit.

4. The device of claim 1 wherein said photoconductive members each comprise a layer of photoconductive material deposited on said plate member and in electrical contact with the ends of the associated grids, said photoconductive layers interconnecting the power source and the grids.

5. The device of claim 1 wherein said first and second plurality of grids run substantially normal to each other.

6. The device of claim 4 wherein said electroluminescent members each comprise a transparent substrate and electroluminescent material deposited on said substrate in a binary coded arrangement, said transparent substrates each being placed over an associated one of said layers of photoconductive material.

7. In combination:

an electroluminescent display panel, said panel comprising a first and second plurality of cross grids forming a matrix and a layer of electroluminesent material sandwiched between said first and second grids;

an electroluminescent commutator for each of said first and second grids, said commutators each comprising a photoconductive layer positioned adjacent to and in contact with the ends of each of said first and second grids, an electroluminescent member for each of said photoconductive layers, said electroluminescent members being formed from a plurality of electroluminescent elements in a binary coded arrangement, said electroluminescent elements being positioned immediately opposite said photoconductive layers to cover substantially the entire surfaces thereof, a power source connected between the photoconductive layers, said layers interconnecting said power source and said grids, binary switch means for selectively energizing half of the electroluminescent elements at a time, and logical control circuit means for selectively driving said switch means whereby a selected portion of said matrix is energized at a time.

8. The combination of claim 7 wherein said electroluminescent members each comprise a transparent substrate, and electroluminescent material deposited on said substrate, said substrates being placed over said photoconductive layers.

References Cited

UNITED STATES PATENTS

| | | | |
|---|---|---|---|
| 2,698,915 | 1/1955 | Piper | 340—166 X |

JOHN W. CALDWELL, Primary Examiner

H. I. PITTS, Assistant Examiner

U.S. Cl. X.R.

250—215; 315—162; 340—164, 169, 324